United States Patent
Kerti

[15] 3,692,923
[45] Sept. 19, 1972

[54] FLEXIBLE SEALED HOUSING FOR ISOLATED PHASE BUS

[72] Inventor: Joseph A. Kerti, Toronto, Ontario, Canada

[73] Assignee: I-T-E Circuit Breaker (Canada) Limited, Port Credit, Ontario, Canada

[22] Filed: June 22, 1971

[21] Appl. No.: 155,428

[52] U.S. Cl. ............... 174/84 S, 174/88 B, 174/99 E
[51] Int. Cl. ............................................... H02g 5/06
[58] Field of Search ...... 174/13, 68 B, 84 R, 84 S, 86, 174/88 B, 88 S, 99 B, 99 E, 100

[56] References Cited

UNITED STATES PATENTS

| | | | |
|---|---|---|---|
| 2,335,543 | 11/1943 | Rudd | 174/99 E |
| 2,664,456 | 12/1953 | Schymik | 174/99 B |
| 2,783,299 | 2/1957 | Schymik | 174/99 B |
| 2,784,012 | 3/1957 | Killian et al. | 174/99 B UX |

*Primary Examiner*—Laramie E. Askin
*Attorney*—Samuel Ostrolenk et al.

[57] ABSTRACT

Two housing sections of isolated phase bus are jointed together, end-to-end, and air-tightly sealed by a cover assembly comprising two cover halves engaging one another along their straight mating edges by suitable flexible gasket means. Annular shaped rolling gasket means provides an air-tight closure between the end of one housing section and the associated ends of the cover halves to provide for rolling engagement therebetween. Second annular gasket means is positioned between the end of the remaining housing section and the ends of the cover halves associated therewith and it is designed so as to prevent no moving or sliding engagement therebetween. One cover half is provided with rigid connectors welded to one end of the cover half and adapted to be bolted to the end of the adjacent housing section. Flexible connectors are welded to the opposite end of the same cover half and are adapted to be bolted to the adjacent housing. The connector provide a continuous electrical path between the adjacent housing sections which are joined and sealed by the cover halves. The cover half not provided with the above mentioned connectors allows for subsequent disassembly for maintenance or repair without unbolting the connectors. The apparatus provides the necessary continuous electrical path while eliminating the need for any welding operations in the field to facilitate both assembly and disassembly thereof.

6 Claims, 8 Drawing Figures

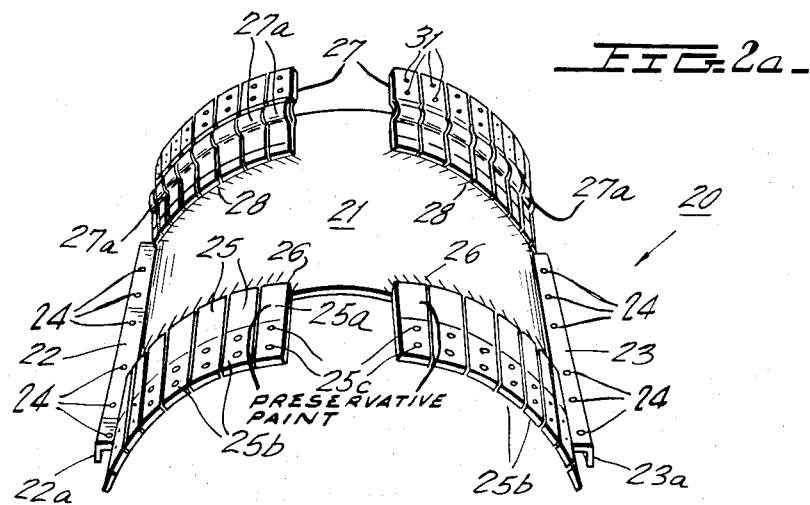
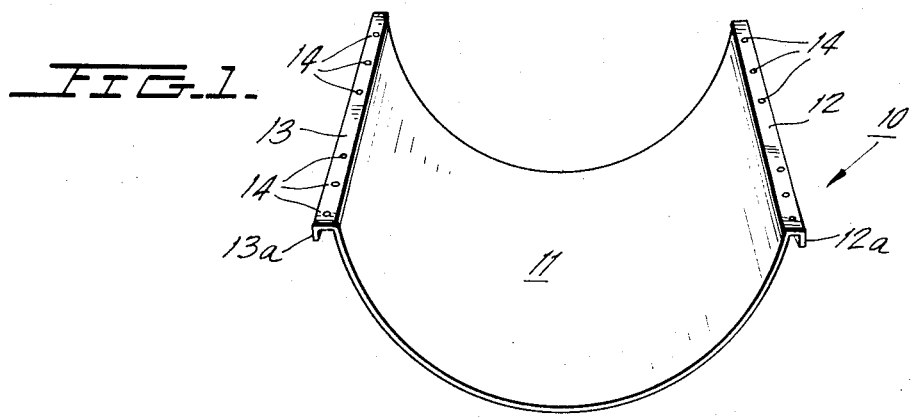
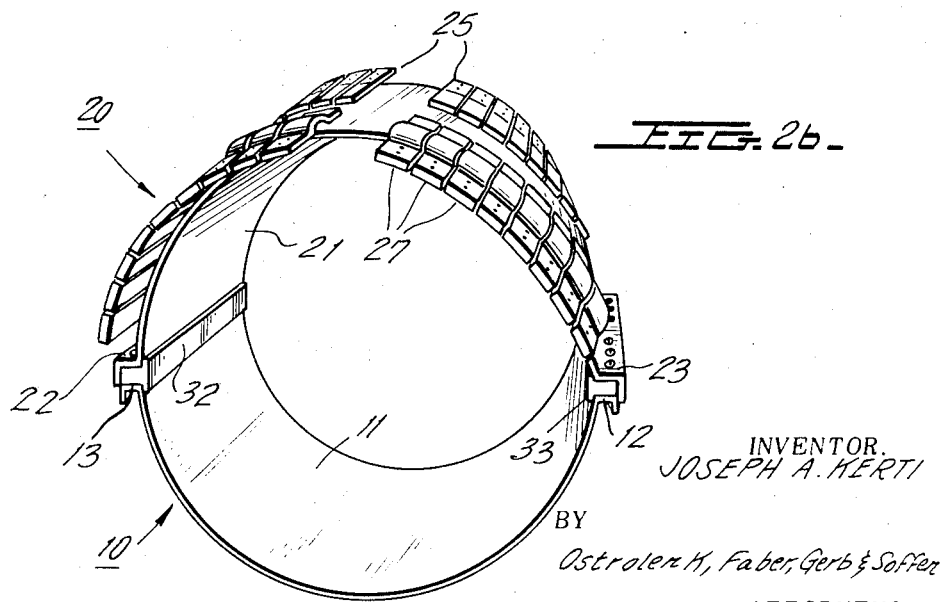

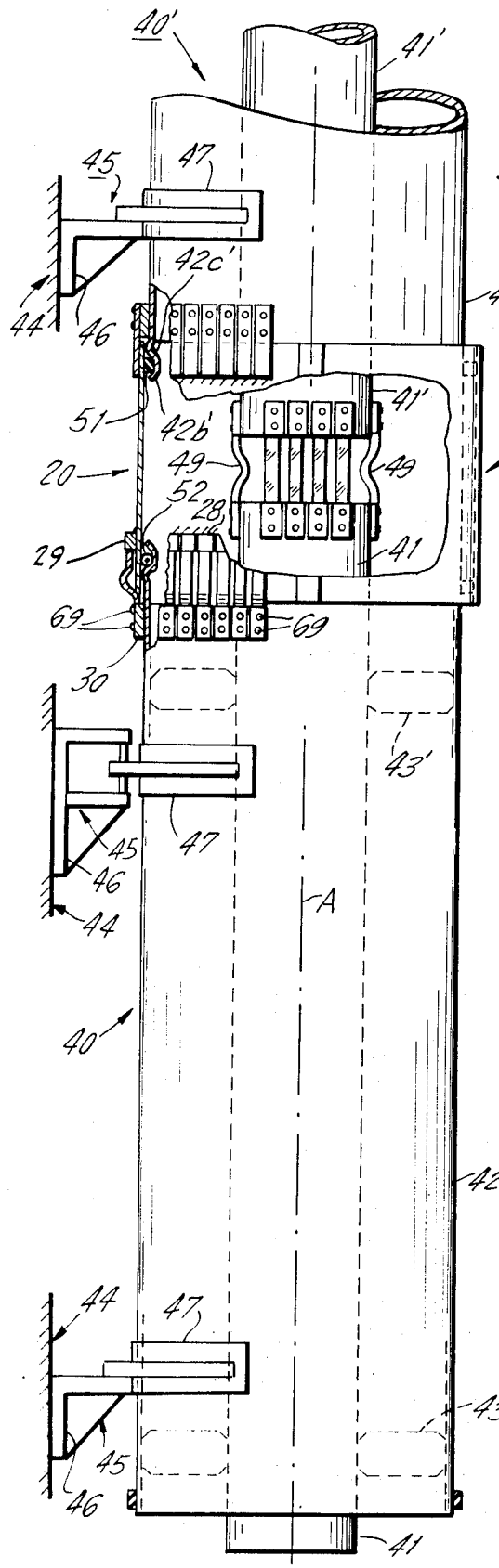
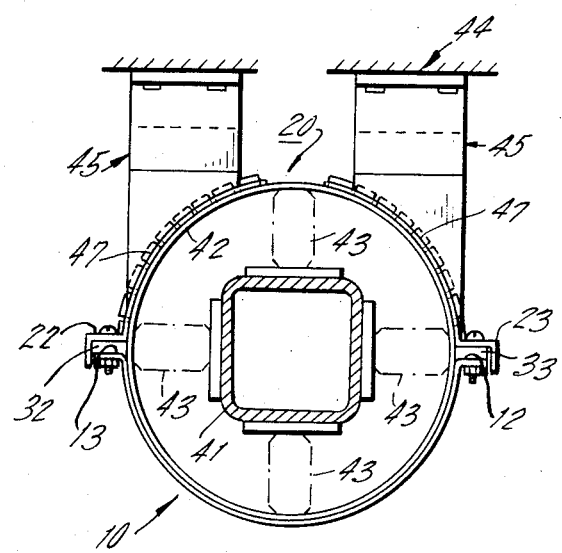

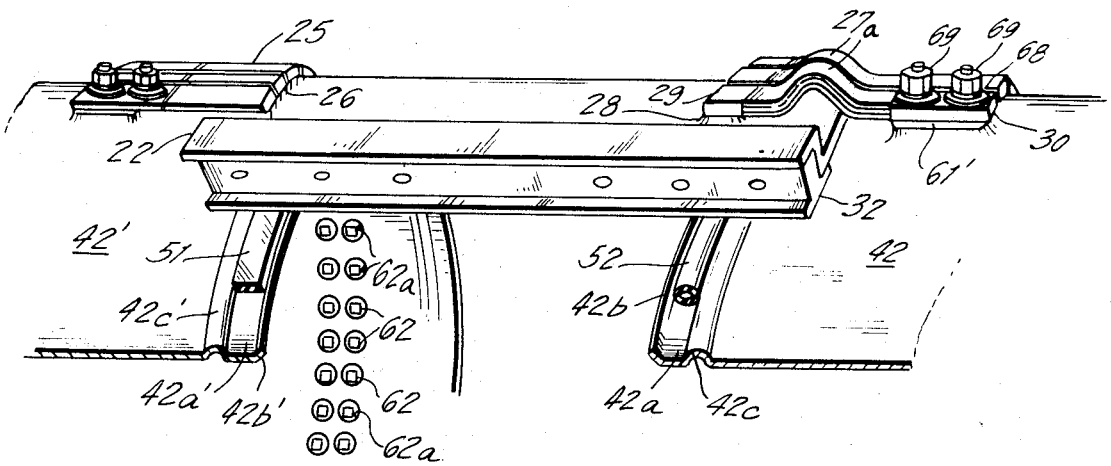
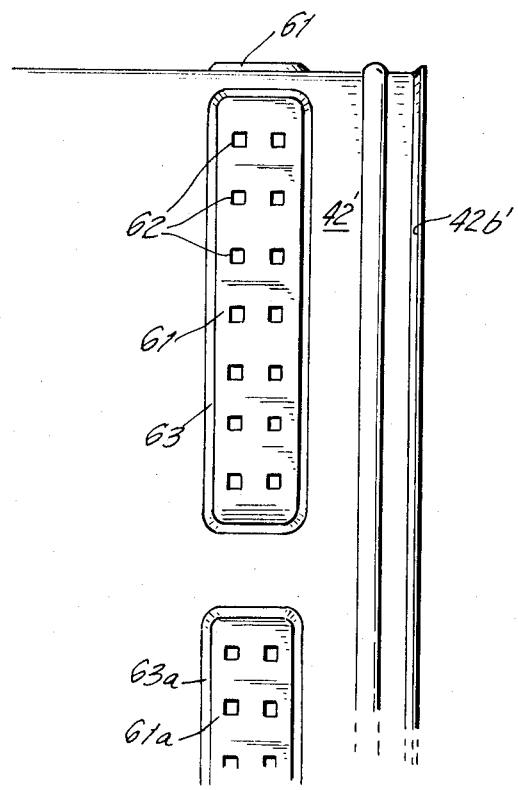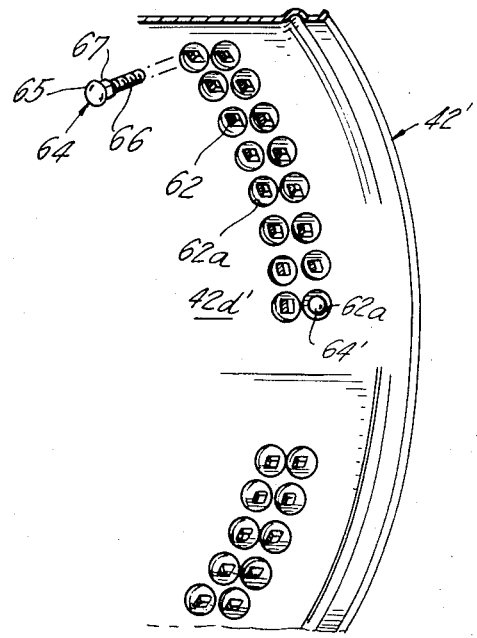

FLEXIBLE SEALED HOUSING FOR ISOLATED PHASE BUS

The present invention relates to isolated phase bus assemblies and more particularly to a novel cover assembly for coupling and sealing isolated phase bus housing sections arranged end-to-nd while eliminating the need for any field welding operations.

Isolated phase bus systems are well known in the art of power transmission and distribution and are typically comprised of a plurality of isolated phase bus sections electrically connected end-to-end. Each section is provided with a central or interior conductor operated at an elevated voltage level and a conductive metal housing surrounding and concentric with the interior conductor, which housing is normally maintained at or near ground potential. The end-to-end sections in conventional isolated phase bus runs are normally coupled together and sealed by housing covers which are welded to the adjacent housing sections in the field.

In installations of the type described hereinabove it is desirable to provide a continuous conducting path from housing section to housing section so that the electromagnetic field of the bus run can induce currents in the housing, the advantages being to provide a bus run whose housing sections can be employed for current carrying purposes so as to serve as a return electrical path as well as providing a significant reduction in the electromagnetic forces exerted by adjacent parallel housing sections typically employed in multi-phase isolated phase bus systems.

In order to provide continuous conductive electrical paths between housings it is conventional to join the housing cover portions which couple the isolated phase bus housing sections by means of weld joints to establish an electrical connection which provides a low resistance electrical path.

Almost all of such installation operations must be performed in the field so as to provide good electrical contact at the joints as well as providing for expansion and contraction. Welding techniques have been employed in conventional systems because of their ability to provide both a seal and a good electrical contact. However, in many installations it is desirable to avoid welding of the joints in the field due to the scarcity of skilled labor which is available to perform such tedious and exacting operations. Also, field welding costs are extremely high, especially when compared to factory welding costs and/or fabrication due to the fact that such welding operations cannot be performed in accordance with mass production techniques. Furthermore, with field welding, there is considerable inconvenience and difficulty especially in connection with repair to any components that may be damaged as well as clean-up operations following the welding activity. Welding operations employed in connection with disassembly of the cover members are also difficult and further serve to complicate and increase the costs of such installations.

The present invention is characterized by providing a "flexible" housing cover assembly which provides an excellent seal and a continuous low resistance conductive path between housings of adjacent bus sections while at the same time being so designed as to greatly facilitate assembly and disassembly thereof.

The present invention is comprised of first and second cover halves adapted to be joined and sealed to one another and to seal the gap between two adjacent bus section housings arranged end-to-end. One of the covers is provided with a plurality of rigid connectors joined to the cover preferably by welding. The rigid connectors are arranged to overlie and be mechanically joined to the end portion of one adjacent bus section housing. A second plurality of flexible connectors are permanently secured to the first cover member and are adapted to be mechanically joined to the end of the remaining adjacent bus section housing.

Each of the free end portions of the adjacent bus section housings is provided with annular grooves for receiving separate gasket means to air-tightly seal the region between the bus sections enclosed by the cover members whereby one of the gaskets permits movement between cover and housing. The aforesaid remaining gasket and the flexible connectors cooperate to allow for relative movement between the cover assembly and an associated one of the bus section housings to allow for normal expansion and contraction of the bus run while respectively maintaining the integrity of the air-tight seal and of the low resistance conductive path. The mechanical arrangements joining the covers to the end-to-end bus section housings greatly facilitate both assembly and disassembly in the field application, thereby eliminating the need for tedious and complex welding operations which would otherwise be required under unfavorable field conditions. Since only one of the covers carries conductive members, the remaining cover design greatly simplifies assembly and disassembly and/or repair operation.

For example, one object of the present invention is to provide a novel cover assembly for bus section housings and the like wherein the cover assembly is designed to provide an air-tight seal and a continuous low resistance conductive path between the joint housing while at the same time being so designed as to greatly facilitate assembly and disassembly thereof, wherein the means for establishing the conductive paths are designed to permit relative movement between the joined housing sections and at the same time maintain the integrity of the above mentioned conductive path.

Another object of the present invention is to provide a novel cover assembly for air-tightly sealing the bus section housings and the like and being so designed as to eliminate the need for any welding operations in the field connected with the assembly and/or disassembly of the cover members, and wherein the cover assembly further cooperates with the joined housing sections and connecting means provided thereon to air-tightly seal the joined housing sections while at the same time providing for relative movement between the joined housing sections which is normally encountered in such bus run installations.

These as well as other objects of the present invention will become apparent from reading the accompanying description and drawings in which:

FIG. 1 is a perspective view showing one cover member of the present invention;

FIG. 2a is a perspective view showing the companion cover member of the present invention;

FIG. 2b is a perspective view showing the two cover members joined together;

FIGS. 3a and 3b are side and end views, respectively, of a typical single phase isolated phase bus installation incorporating the companion cover members shown in FIGS. 1-2b;

FIG. 4 is a perspective view showing the gaskets employed in the cover assembly in greater detail;

FIG. 5a is a perspective view showing one exterior portion of an isolated phase bus housing which is employed for joining the conductive cover housing;

FIG. 5b is a perspective view showing one interior end portion of an isolated phase bus housing which is the interior view corresponding to the exterior portion of FIG. 5a.

The cover assemblies 10 and 20 of the present invention are shown best in FIGS. 1, 2a and 2b. Cover member 10 is comprised of a semicircular body portion 11 having a pair of mounting flanges 12 and 13 extending outwardly along its linear edges. Each of the flanges 12 and 13 is provided with an outwardly turned marginal portion 12a and 13a, respectively, so as to mate with similarly shaped flanges of the companion cover member in a manner to be more fully described. The flanges 12 and 13 are each further provided with a plurality of spaced openings 14 for receiving threaded fastening members to rigidly join the covers to one another.

Cover member 20 has a substantially semicircular shaped body portion 21 provided with a pair of outwardly turned mounting flanges 22 and 23 integrally joined with and extending from the linear edges of body portion 21. The marginal end portions of each of the flanges 22 and 23 are bent so as to extend downwardly as shown best at 22a and 23a, respectively. Each of the flanges 22 and 23 is provided with spaced openings 24 which are arranged so as to be in alignment with the openings 14 of flanges 12 and 13 when the cover members are in the assembled position.

Cover member 21 is further provided with a plurality of rigid conductive bridges 25 preferably welded to the exterior convex surface of body member 21 in the manner shown where the weldments are as shown, for example, at 26. Preferably, the conductive straps 25 are cleaned over their entire surfaces so as to expose the bare metal. The straps are then welded to body member 21 in the manner shown and then partially coated or otherwise painted with a suitable paint or other material as shown at 25a to preserve the cover and the straps. Portions 25b of each of the straps 25 remain unpainted and each of these portions is provided with a pair of openings 25c to facilitate mechanical joining of the conductive straps to isolated phase bus housing sections in a manner to be more fully described.

The convex surface of body member 21 has further secured thereto a plurality of flexible conductive straps 27 whose first ends are welded to body member 21 wherein the weldments are as shown at 28 The flexible straps are preferably formed of a multiplicity of layers of sheets comprised of thin conductive strips. The central portions 27a of each of the flexible conductive straps form a substantially U-shaped configuration so as to facilitate expansion and contraction thereof in a controlled manner.

One end of each of the flexible conductive straps is mounted within a solid metallic end terminal 29 which is rigidly secured to the conductive layers and which in turn is welded to body portion 21 as shown best in FIG. 4. The opposite end of each of the flexible conductive straps is secured to a second conductive terminal 30 which is mechanically and electrically connected to the conductive layers and is further provided with a pair of openings 31 for receiving threaded fastening members in a manner to be more fully described.

FIG. 2b shows the manner in which the cover members 10 and 20 are joined together when in the assembled state. As can clearly be seen a pair of gaskets 32 and 33, preferably formed of a resilient material, are positioned between the mating flanges 13-22 and 12-23. Each of the gaskets (although not shown) is provided with openings which are aligned so as to be coincident with associated openings 14 and 24 in the mounting flanges of cover members 10 and 20, respectively, so as to receive threaded fastening members therethrough for firmly securing the housing assemblies to one another and partially comprising gaskets 32 and 33. As can further be seen from FIG. 2b, the marginal end portions 22a and 23a of cover member 20 overlap and embrace the marginal portions 13a and 12a, respectively, of the flanges 13 and 12.

FIGS. 3a and 3b show side and end views, respectively, of a portion of a bus run which may be employed in a single phase isolated phase bus assembly. Adjacent sections arranged end-to-end are shown therein (to be more fully described) so as to facilitate a showing of the manner in which the cover assemblies are joined thereto. FIG. 3a shows a first section 40 of an isolated phase bus and a second section 40' a portion of which has been removed so as to simplify the Figure, it being understood that the bus section 40' may be otherwise substantially identical to bus section 40. Alternatively, the bus sections 40 and 40' may be of differing lengths and/or shapes so long as their end portions mate in the manner to be more fully described, in order that their adjacent end sections may be joined and covered by the cover assemblies described hereinabove.

Each of the isolated phase bus sections 40 and 40' is comprised of a central conductor 41 and 41' which, in FIG. 3b, is shown as being hollow and as having a rectangular cross-section. The central conductor 41 is surrounded by and arranged concentric with a hollow cylindrically shaped conductive housing 42 which is maintained in concentric position by a plurality of radially aligned insulator members 43 which are suitably joined at their opposite ends to the housing 42 and the central conductor 41. The insulator members are arranged in radial fashion and groups of such insulator members are arranged at spaced intervals along the bus sections as shown by the designating numerals 43 and 43' in FIG. 3a.

The housing sections may be supported by any suitable supporting structure so as to maintain the housings at an elevated position above a mounting surface 44. The mounting surface may be arranged so as to be horizontal, vertical or at any other angle. Alternatively, the bus may be installed underground as well. The supporting structures 45 are arranged at spaced intervals along each bus section and are provided with base portions 46 to be joined to the supporting surface 44 and arcuate shaped portions 47 so as to conform to the shape of housing 42 and so as to support the housing 42 in spaced relationship relative to supporting surface 44 and suitable joining means may be employed, such as, for example, mechanical joining means, welding and the like.

The bus sections 40 and 40' are aligned by the support means 45 so as to have their longitudinal axes coincident with one another as represented by phantom line A. The left-hand end of housing 42 is arranged so as to be spaced a predetermined distance from the right-hand end of housing 42' in a manner shown best in FIG. 3a. The central conductors 41 and 41' of the bus sections 40 and 40' are joined to one another by suitable laminated flexible connector straps 49 which are either bolted or field welded at their opposite ends to the central conductors 41 and 41' in the manner shown best in FIG. 3a.

Once the central conductors are electrically joined, the cover members 10 and 20 are then mechanically secured to the adjacent end portions of housings 42 and 42' so as to be aligned in the manner shown.

Prior to assembly of the covers, first and second annular shaped gasket means 51 and 52 are appropriately positioned around the marginal edges of the housing section ends as shown best in FIG. 4.

Housing section 42' is shown as being provided with an annularly shaped recess or groove 42a' which is positioned between an outwardly directed lip portion 42b' and an annularly shaped raised bead portion 42c'. An annular gasket 51 of rectangular cross-section is positioned within groove 42a', which gasket is thicker than the height of bead 42c'. The gasket is preferably formed of cork and is compressed between the groove 42a' and the interior surface of covers 10 and 20 so as to provide a substantially airtight seal around the entire periphery thereof. The tightening of the housing covers upon and around housing 42' causes physical engagement of the interior surface of the housing covers with the raised bed portion 42 c' which, together with the compressed gasket 51 serves to provide a good air-tight seal therebetween.

FIG. 4 further shows the left-hand end of housing 42 as being provided with a similar annular groove 42a bound on one side by the outwardly directed lip 42b and on the opposite side by raised bead portion 42c. An annular shaped gasket 52 of substantially circular cross-section is seated within groove 42a and is compressed or flattened into a substantially oval shape when covers 10 and 20 are mounted upon the end sections of adjacent housings 42' and 42. The nature of gasket 52, however, is such that a rolling frictional engagement is established between housing section 42 and cover members 10 and 20 wherein the air-tight seal established therebetween as a result of the presence of gasket 52 is maintained even though any relative linear movement between covers 10 and 20 and housing 42 may occur (as a result of normal expansion and contraction of the components in the bus run). This rolling frictional engagement is limited by the width of groove 42a which may be of any suitable dimension depending upon the amount of rolling frictional engagement which may be required in any given installation. The arrangements of the gaskets 51 and 52 are also further described in detail in copending application Ser. No. 28,416, filed Apr. 14, 1970, and assigned to the assignee of the present invention. Therefore, any further detail of the gasket assemblies will be omitted herein for purposes of simplicity.

FIGS. 5a and 5b are exterior and interior views, respectively, of end portions of one housing 42' showing the conductive strap mounting portions of the housing in greater detail. As shown in FIG. 5a a pair of mounting surfaces 61 and 61a are arranged at spaced intervals around a portion of the periphery. Each of these surfaces is comprised of an arcuately shaped plate provided with a plurality of square shaped openings 62. The plates are placed against the outer periphery of housing 42' and are welded to the housing as shown by weldments 63 and 63a. It can be seen that the plates 61 and 61a are spaced inwardly from both the end lip 42b' and bead 42c'. Each pair of square shaped openings 62 is spaced a predetermined distance apart so as to coincide with the openings provided in the conductive straps in a manner to be more fully described. The housing 42 is provided with similar conductive mounting pads one of which 61' is shown in FIG. 4. FIG. 5b shows a portion of the interior surface of bus section housing 42' wherein the square shaped holes 62 are shown as extending through the housing and are further provided with recesses 62a surrounding each opening 62 so as to seat the bolt head 65 of a bolt 64 therein. One bolt 64 is shown in exploded fashion relative to its associated opening and is comprised of a threaded portion 66 and a square shaped portion 67 integrally joining the threaded portion 66 to the head portion 65. Another bolt 64' is shown as being seated in recess 62a wherein its square shaped portion is received by the square shaped opening and wherein its threaded portion extends outwardly and protrudes beyond the exposed surface of its associated mounting pad (for example, mounting pad 61). Due to the recess 62a, the head does not protrude from the interior surface 42d'.

The manner in which the cover assemblies 10 and 20 may be joined to the adjacent bus sections 42' and 42 is as follows:

All of the bolts 64 are inserted with their head portions seated within the recesses 62a, their square shaped portions seated within the square shaped opening 62 and their threaded portions extending outwardly beyond the surface of mounting pads 61 and 61a of each of the housings. Cover assembly 20 is then positioned upon the conductive housings 42' and 42 so as to bring the openings 25c of conductive straps 25 into alignment with the openings provided in the mounting pads 61 and 61a, and so as to enable the threaded portions of the bolts to extend through and beyond each of the associated openings 25c As an alternative procedure, the cover may first be brought into the aforesaid alignment and the bolts may then be inserted into the associated square shaped openings. Preferably, however, some means should be provided for at least partially retaining the bolts in position to facilitate securement thereof.

After the aforesaid appropriate positioning, a lockwasher 68 is positioned upon the threaded portion of each bolt and a nut 69, which threadedly engages the threaded portion of each bolt, is screwed upon each bolt and firmly tightened. No means need be provided for holding the bolt in position during the tightening operation due to the fact that the square shaped openings 62 act to secure each of the bolts.

The flexible conductive straps 27 are mounted in a substantially similar fashion by inserting each of the bolts through an associated square shaped opening, mounting a lock-washer 68 and a nut 69 thereupon and firmly tightening the fastening assembly. FIG. 4 shows a few assembled nut and bolt assemblies which have been mounted in the aforesaid fashion.

After all of the conductive straps have been mounted in the aforesaid manner, cover assembly 10 is positioned so as to have its flanges 12 and 13 mate with the flanges 23 and 22, respectively, of cover assembly 20 whereby the openings on each of the mating flanges are arranged so as to be coincident with one another. The flanges are then secured to one another, with the gaskets 32 and 33 being positioned therebetween, by suitable fastening means of a type substantially similar to those described hereinabove. The dimensions of the cover assemblies 10 and 20 are such as to cause an extremely tight fit to be provided about the adjacent ends of housings 42 and 42′ when the fastening members joining the mating flanges 13–22 and 12–23 are firmly tightened. Upon completion of the above described assembly operations, it can be seen that the compressed gaskets 51 and 52, which may be factory installed, (see FIG. 4) provide a good airtight seal between the cover members 10 and 20 and their associated housings while at the same time allowing for certain amount of rolling engagement by virtue of the design of gasket 52 (see FIG. 4). Gaskets 32 and 33 serve to adequately seal the linear joining portions between covers 10 and 20 so as to provide a complete seal for the assembly.

It can be seen that the above arrangement, when fully assembled, provides an excellent low resistance conductive path between the conductive housing which path extends, for example, from housing 42 through flexible straps 27, conductive cover 20, rigid straps 25 and conductive housing 42′. Since only cover 20 carries the conductive straps, inspection of the interior of the bus run is greatly simplified since removal of cover 10 necessitates only that the fastening members joining he mating flanges 13–22 and 12–23 be removed. Obviously, reassembly of the housing can be done with equal facility.

It can therefore be seen from the foregoing description that the present invention provides a novel cover assembly for joining housing sections and the like wherein the integrity of the required air-tight seal and the integrity of a conductive path between adjacent housing sections is maintained while at the same time assembly and disassembly of the cover portions is greatly facilitated, while at the same time eliminating the need for any field welds insofar as assembly and/or disassembly of the cover assemblies is concerned.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. In an isolated phase bus run having first and second annularly shaped conductive bus housings each enclosing an inner conductor, and each of which is adapted to have an end portion thereof enclosed by a cover assembly of similar contour which assembly is placed in overlapping relationship with respect to said end portions;

at least said end portions of said first and second bus housings being substantially in axial alignment with each other, with said end portions being a spaced distance apart;

said cover assembly being comprised of first and second conductive cover halves;

the adjacent end portions of said first and second bus housings each having a continuous annular groove spaced inwardly from the marginal edge of the housing;

first and second compressible gaskets, each being positioned in an associated one of said grooves;

said first and second cover halves each having a pair of flanges along their straight mating edges; fastening means securing said cover halves together to thereby compress said gaskets between said cover assembly and said housing;

a plurality of rigid conductive straps joined to a first end of said first cover half; a plurality of flexible conductive straps joined to a second end of said first cover member;

fastening means joining said rigid straps to one of said housings and joining said flexible straps to the other one of said bus housings for establishing a low resistance electrical path between first and second bus housings.

2. The apparatus of claim 1 wherein said first gasket has a rectangular cross-sectional configuration and is adapted to provide an air-tight seal between said cover assembly and its associated bus housing.

3. The apparatus of claim 1 wherein said second gasket has a cross-sectional tubular configuration and is adapted to provide rolling frictional engagement between said cover assembly and its associated bus housing.

4. The apparatus of claim 1 wherein said bus housing end portions are provided with rectangularly shaped openings for receiving fastening means securing said conductive straps thereto and wherein said fastening means comprise bolts each having a head portion joined to a threaded portion by an intermediate portion of rectangular cross-section received by said rectangularly shaped openings.

5. The apparatus of claim 4 wherein said bus housing end portions are each further provided with recesses surrounding each rectangularly shaped opening seating each head portion of said bolts.

6. The apparatus of claim 1 wherein the said cover assembly further comprises third and fourth compressible gasket means positioned between said pairs of mating flanges for sealing said cover halves and thereby cooperating with said first and second gasket means to air-tightly seal said cover assembly to said bus housings.

* * * * *